(12) United States Patent
Oishi et al.

(10) Patent No.: US 9,917,338 B2
(45) Date of Patent: Mar. 13, 2018

(54) BATTERY PACK

(71) Applicant: KABUSHIKI KAISHA TOYOTA JIDOSHOKKI, Aichi-ken (JP)

(72) Inventors: Hidefumi Oishi, Kariya (JP); Takayuki Kato, Kariya (JP); Hirohisa Kato, Kariya (JP); Hiromi Ueda, Kariya (JP); Fumihiko Ishiguro, Kariya (JP); Naoto Morisaku, Kariya (JP); Kazuki Maeda, Kariya (JP); Takashi Sakai, Kariya (JP); Shintaro Watanabe, Kariya (JP); Atsushi Yamaguchi, Kariya (JP); Yuki Chujo, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 160 days.

(21) Appl. No.: 14/779,792

(22) PCT Filed: Mar. 18, 2014

(86) PCT No.: PCT/JP2014/057242
§ 371 (c)(1),
(2) Date: Sep. 24, 2015

(87) PCT Pub. No.: WO2014/156802
PCT Pub. Date: Oct. 2, 2014

(65) Prior Publication Data
US 2016/0049702 A1 Feb. 18, 2016

(30) Foreign Application Priority Data

Mar. 29, 2013 (JP) ................................. 2013-071334

(51) Int. Cl.
*H01M 10/50* (2006.01)
*H01M 10/625* (2014.01)
(Continued)

(52) U.S. Cl.
CPC ....... *H01M 10/625* (2015.04); *H01M 2/1077* (2013.01); *H01M 10/617* (2015.04);
(Continued)

(58) Field of Classification Search
None
See application file for complete search history.

(56) References Cited

U.S. PATENT DOCUMENTS 3,649,366 A 3/1972 Jordan et al.
4,762,978 A 8/1988 Tanis
(Continued)

FOREIGN PATENT DOCUMENTS

CN 2297437 11/1998
CN 101608877 12/2009
(Continued)

OTHER PUBLICATIONS

Extended European Search Report for EP Appl. No. 14773591.4, dated Aug. 25, 2016.
(Continued)

*Primary Examiner* — Scott J Chmielecki
(74) *Attorney, Agent, or Firm* — Greenblum & Bernstein, P.L.C.

(57) ABSTRACT

A battery pack includes a battery module including a plurality of cells, a housing that accommodates the battery module and is thermally coupled to the battery module, and a temperature adjuster that is thermally coupled and attached to the housing. The temperature adjuster changes a temperature of the housing.

7 Claims, 5 Drawing Sheets

(51) Int. Cl.
　　　H01M 2/10　　　(2006.01)
　　　H01M 10/6571　(2014.01)
　　　H01M 10/6572　(2014.01)
　　　H01M 10/617　　(2014.01)
　　　H01M 10/635　　(2014.01)

(52) U.S. Cl.
　　　CPC ..... *H01M 10/635* (2015.04); *H01M 10/6571* (2015.04); *H01M 10/6572* (2015.04); *H01M 2220/20* (2013.01)

(56) References Cited

U.S. PATENT DOCUMENTS

| | | | |
|---|---|---|---|
| 5,039,927 | A | 8/1991 | Centafanti |
| 5,281,792 | A | 1/1994 | Lee et al. |
| 6,228,524 | B1* | 5/2001 | Kohler ................ H01M 10/625 |
| | | | 429/148 |
| 2002/0090546 | A1 | 7/2002 | Mu-Tsai et al. |
| 2008/0226969 | A1 | 9/2008 | Fattig |
| 2009/0148754 | A1* | 6/2009 | Marchio ............. H01M 2/1077 |
| | | | 429/83 |
| 2009/0283346 | A1* | 11/2009 | Katae ...................... B60K 1/04 |
| | | | 180/68.2 |
| 2011/0027625 | A1* | 2/2011 | Payne .................... H01M 6/50 |
| | | | 429/50 |
| 2012/0171546 | A1 | 7/2012 | Tagawa et al. |
| 2015/0053489 | A1* | 2/2015 | Nakazawa ............. B66F 9/075 |
| | | | 180/65.1 |

FOREIGN PATENT DOCUMENTS

| | | |
|---|---|---|
| EP | 2 119 586 | 11/2009 |
| JP | 2002-75469 | 3/2002 |
| JP | 2002-282136 | 10/2002 |
| JP | 2007-213939 | 8/2007 |
| JP | 2010-61921 | 3/2010 |
| JP | 2011-54353 | 3/2011 |
| JP | 5162053 | 3/2013 |
| JP | 2013-157112 | 8/2013 |
| WO | 03/001313 | 1/2003 |
| WO | 2011/151702 | 12/2011 |
| WO | 2012/029240 | 3/2012 |
| WO | 2012/137582 | 10/2012 |

OTHER PUBLICATIONS

International Search Report, with English-language translation thereof, for PCT/JP2014/057242, dated May 27, 2014.
English-language translation of the International Preliminary Report on Patentability for PCT/JP2014/057242, dated Sep. 29, 2015.

* cited by examiner

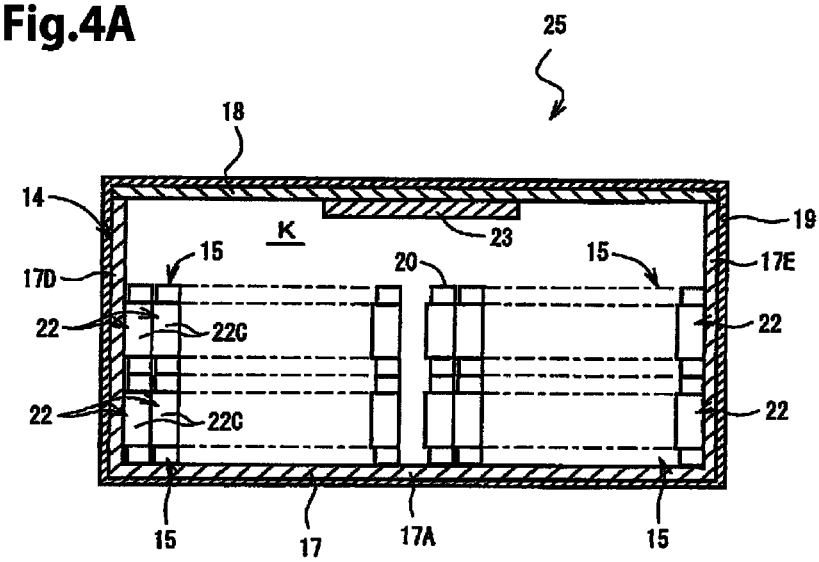
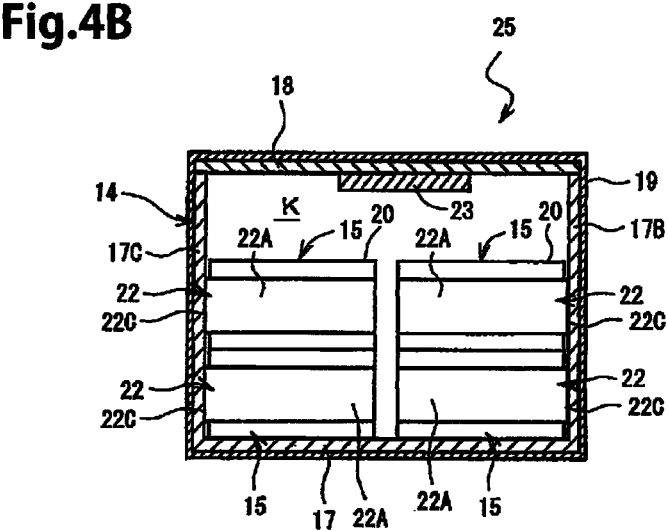

BATTERY PACK

TECHNICAL FIELD

The present invention relates to a battery pack.

BACKGROUND ART

Patent Document 1 discloses a battery temperature-control device as a prior art example of a battery pack.

The battery temperature-control device of Patent Document 1 includes a main battery including a unit of cells, a sheet heater that is heated when supplied with current, and a temperature sensor that detects the temperature of the battery. The sheet heater, which is located between the cells, is arranged at two locations in contact with all of the cells. A heater that generates heat when supplied with current is incorporated in the sheet heater.

When the temperature detected by the temperature sensor is lower than a certain value, an auxiliary battery applies current to the sheet heater to control the temperature of the main battery with the heat of the sheet heater. This maintains the main battery at a proper temperature and prevents reduction in the battery capacity even during the winter.

PRIOR ART DOCUMENT

Patent Document

Patent Document 1: Japanese Laid-Open Patent Publication No. 2002-75469

SUMMARY OF THE INVENTION

Problems that are to be Solved by the Invention

However, the battery temperature-control device of Patent Document 1 includes the sheet heater arranged at two locations in contact with all of the cells. This increases the number of installed sheet heaters and the area occupied by the installed sheet heaters. Further, heat is directly transmitted from the sheet heater to each cell from where the sheet heater contacts each cell. Thus, each cell is directly affected by temperature changes that occur when the sheet heater is turned on and off. As a result, in each cell, the temperature may not be uniform, and there may be variations in the temperature.

It is an object of the present invention to provide a battery pack that is capable of uniformly adjusting the temperature of the entire battery pack and simplifying the structure of the battery pack.

Means for Solving the Problem

One aspect of a battery pack according to the present invention includes a battery module including a plurality of cells, a housing that accommodates the battery module and is thermally coupled to the battery module, and a temperature adjuster that is thermally coupled and attached to the housing. The temperature adjuster changes a temperature of the housing.

In the above aspect, when the temperature adjuster heats or cools the housing, the temperature of the battery module is indirectly adjusted (heated or cooled) through the housing. This allows the temperature of the entire battery module to be adjusted more uniformly and allows the structure of the battery pack to be more simplified than when the battery module is directly heated or cooled by the temperature adjuster.

BRIEF DESCRIPTION OF THE DRAWINGS

FIG. 4A is a cross-sectional view taken in direction X in FIG. 2, and FIG. 4B is a cross-sectional view taken in direction Y in FIG. 2.

EMBODIMENTS OF THE INVENTION

A battery pack according to one embodiment of the present invention will now be described with reference to FIGS. 1 to 5.

Figure 1:
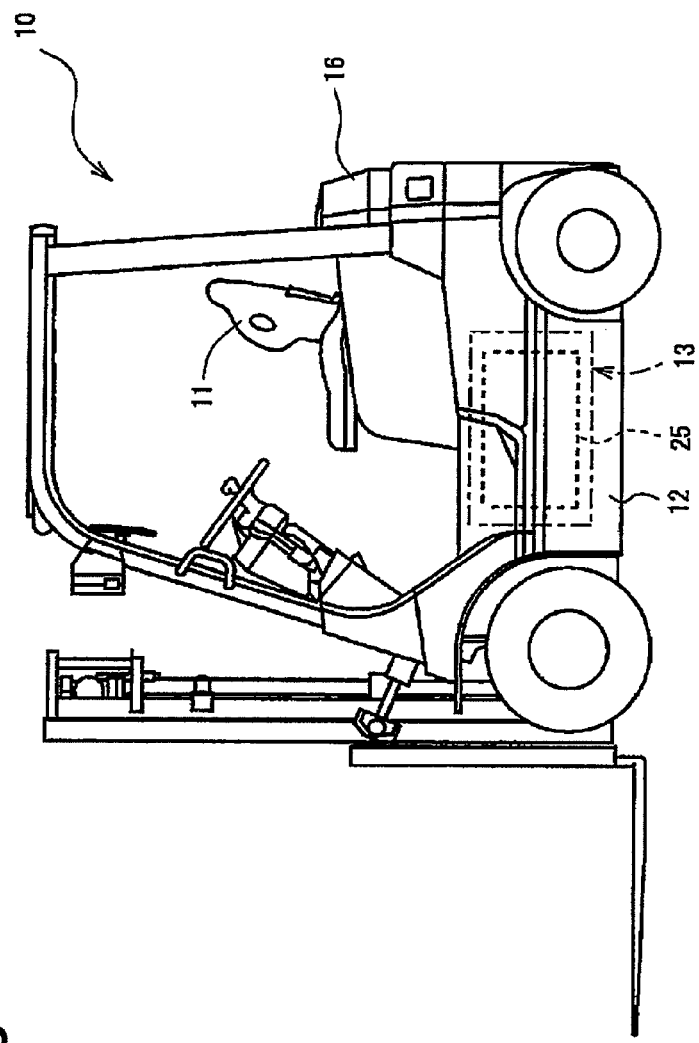
FIG. 1 is a side view showing the entire structure of a forklift according to one embodiment of the present invention.

A drive source for a battery forklift 10 shown in FIG. 1 is a lithium-ion battery.

The battery forklift 10 includes a battery pack 25, which is arranged in an accommodation compartment 13. The accommodation compartment 13 is located below a seat 11. The battery pack 25 also functions as a counterweight that adjusts the balance of a vehicle body 12. A counterweight 16, which adjusts the balance of the vehicle body 12, is arranged at the rear side of the seat 11. The counterweight 16 is separated from the battery pack 25.

The battery pack 25 includes a lithium-ion battery. A lithium-ion battery is lighter than a lead-acid battery that has the same capacity. Thus, there may be cases in which the battery pack 25 is not able to function as a counterweight that adjusts the balance of the vehicle body 12. In the present embodiment, the battery pack 25 includes a counterweight in addition to the lithium-ion battery so that the battery pack 25 has the same weight as a conventional battery pack including a lead-acid battery.

Figure 2:
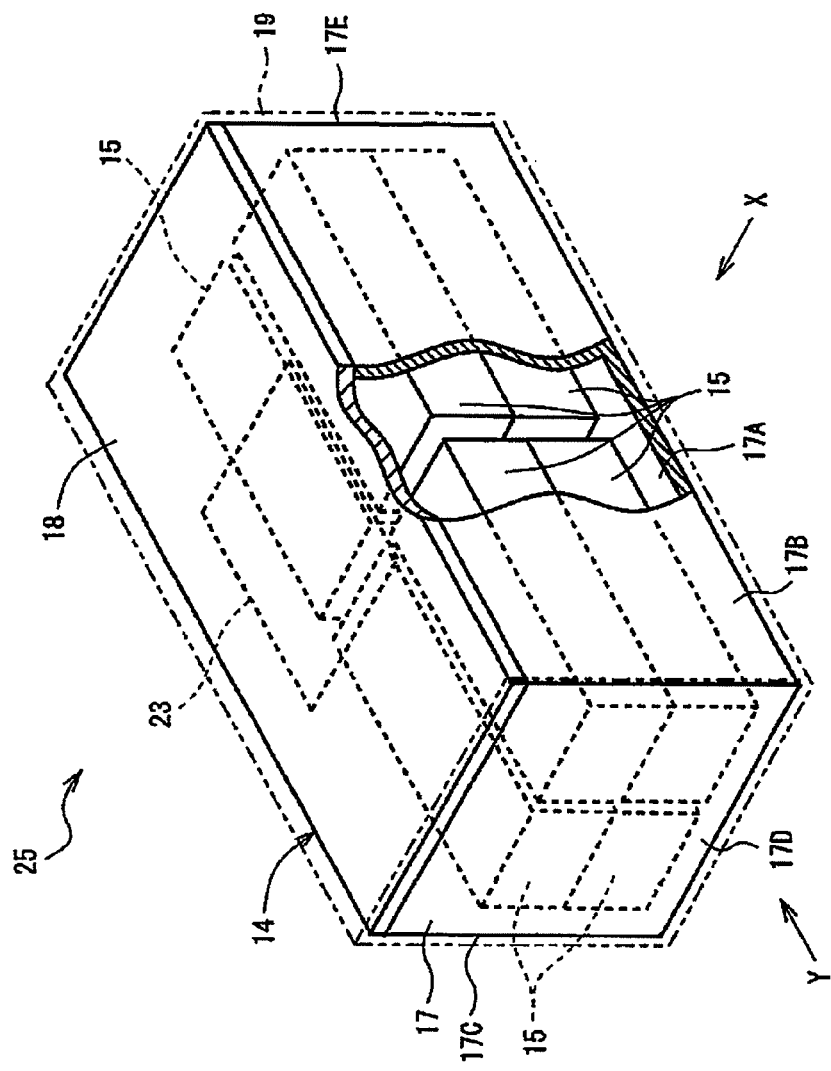
FIG. 2 is a perspective view showing the entire structure of a battery pack of FIG. 1.

As shown in FIG. 2, the battery pack 25 includes an accommodation container 14, which serves as a housing, and a plurality of battery modules 15, which are accommodated in the accommodation container 14. Eight battery modules 15 are accommodated in the accommodation container 14. The eight battery modules 15 are stacked in pairs.

The accommodation container 14 includes a box-shaped body 17, which includes an upper opening, and a lid 18, which covers the opening of the body 17.

The body 17 includes a tetragonal bottom plate 17A and tetragonal side walls 17B to 17E, which project from the four sides of the bottom plate 17A. In the following description, the side walls projecting from the long sides of the bottom plate 17A are referred to as the side walls 17B and 17C, and the side walls projecting from the short sides of the bottom plate 17A are referred to as the side walls 17D and 17E.

The lid 18 is arranged to cover the opening of the body 17 and seal the accommodation container 14.

The accommodation container 14 is formed from a material having a higher thermal conductance than air.

In the present embodiment, the accommodation container 14 is formed from an iron metal material that is relatively heavy so that the accommodation container 14 also functions as a counterweight. Accordingly, the thermal conductivity of the accommodation container 14 is higher than that of air under the same environmental conditions (temperature and humidity).

In the accommodation container 14, the side wall 17B, the side wall 17C, and the lid 18 are thicker than the side wall 17D, the side wall 17E, and the bottom plate 17A.

As shown in FIGS. 4A and 4B, a sheet heater 23 is attached to an inner wall surface of the lid 18. The sheet heater 23 corresponds to a temperature adjuster that changes the temperature of the battery modules 15. The sheet heater 23 is attached in planar contact with the lid 18. More specifically, the lid 18 is thermally coupled to the sheet heater 23, which allows heat to be exchanged between the lid 18 and the sheet heater 23.

An insulator 19, which covers the entire accommodation container 14, is arranged on the periphery of the accommodation container 14. The insulator 19 limits leakage of heat from the accommodation container 14. The insulator 19 is formed from a resin material having good thermal insulation characteristics.

The battery modules 15 are accommodated in the accommodation container 14 and coupled with the side wall 17B or 17C.

As shown in FIGS. 4A and 4B, the battery modules 15 are spaced apart from the lid 18 to form a gap K between the battery modules 15 and the lid 18 so that the sheet heater 23 does not directly contact each battery module 15.

Figure 3A:
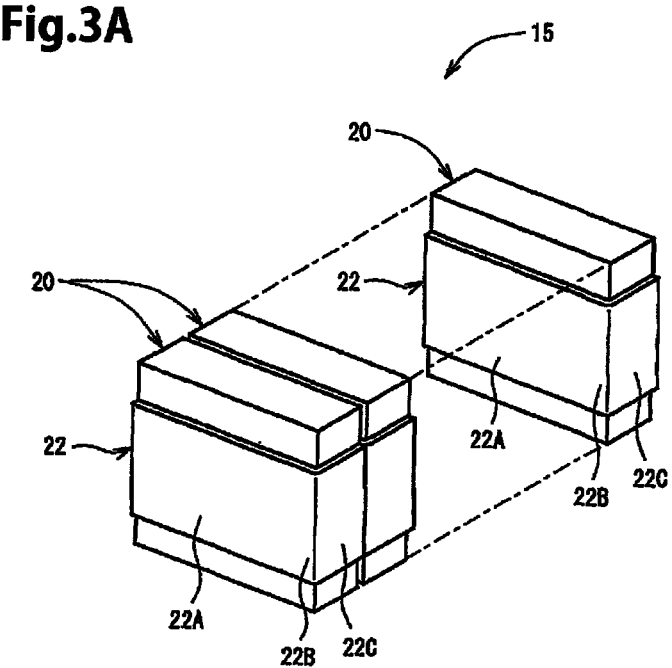
FIG. 3A is a perspective view showing the schematic structure of a battery module of FIG. 2.
Figure 3B:
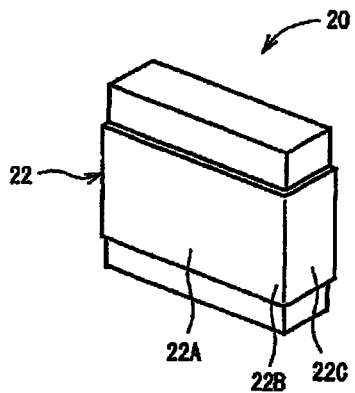
FIG. 3B is a perspective view showing a cell of FIG. 3A.

As shown in FIGS. 3A and 3B, the battery module 15 is a unit of cells 20. The cells 20 are mechanically coupled integrally and electrically coupled in series.

Figure 5:
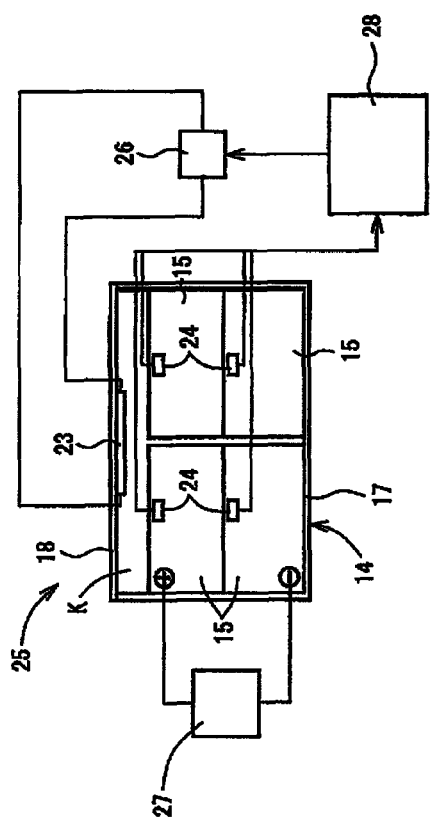
FIG. 5 is a diagram showing a temperature adjustment system for the battery pack of FIG. 1.

As shown in FIG. 5, each battery module 15 includes a single temperature detector 24.

The cell 20 of the present embodiment is a prismatic battery.

A metal heat transmission plate 22, which is bent to be L-shaped, is coupled to each cell 20. The heat transmission plate 22 includes a coupling portion 22A, which has the form of a tetragonal plate, and a held portion 22C, which has the form of a tetragonal plate. The held portion 22C extends in the thickness direction of the coupling portion 22A from a longitudinal first end 22B of the coupling portion 22A. The coupling portion 22A of the heat transmission plate 22 is arranged between the cells 20. The coupling portion 22A is coupled to a front surface of a cell 20 (one of two surfaces orthogonal to a direction the cells 20 are laid out) and to a rear surface of the adjacent cell 20 (surface opposing the front surface). The held portion 22C is coupled to the side surface of the cell 20 and the side wall of the accommodation container 14. The outer surface of each cell 20 where the heat transmission plate 22 is not coupled is covered by an insulating resin.

More specifically, as shown in FIG. 4B, in the battery modules 15 arranged adjacent to the side wall 17B (right battery modules 15), the held portion 22C of each heat transmission plate 22 is coupled to the side wall 17B and to the surface of the corresponding cell 20 opposing the side wall 17B, that is, the side surface of the cell 20. In the battery modules 15 arranged adjacent to the side wall 17C (left battery modules 15), the held portion 22C of each heat transmission plate 22 is coupled to the side wall 17C and to the surface of the corresponding cell 20 opposing the side wall 17C, that is, the side surface of the cell 20.

The cell 20 is formed by, for example, a lithium-ion battery. The cell 20 is a battery having good output characteristics under room temperature (20° C.). A battery having good output characteristics under room temperature refers to a battery having output characteristics that are temperature-dependent and stable when, for example, heated (warmed) to approximately 20° C.

FIG. 5 is a diagram showing a temperature adjustment system of the battery pack 25. The temperature adjustment system of the battery pack 25 includes the battery modules 15, the accommodation container 14 that accommodates the battery modules 15, the sheet heater 23 that adjusts the temperature of the battery modules 15, and the temperature detectors 24 that detect the temperature of the battery modules 15. The temperature adjustment system of the battery pack 25 further includes a power supply 26, a load 27, and a controller 28. The power supply 26 is connected to the sheet heater 23. The load 27 is connected to the positive and negative output terminals of the battery modules 15. The controller 28 receives detection signals from the temperature detectors 24 and controls the power supply 26.

The controller 28 controls the power supply 26 so that power is supplied from the power supply 26 to the sheet heater 23 when determining that the sheet heater 23 needs to be driven based on the detection signals from the temperature detectors 24.

The operation of the battery pack 25 and the temperature adjustment system of the battery pack 25 will now be described.

First, the controller 28 determines whether or not the temperature of the battery modules 15 needs to be adjusted based on the detection signals from the temperature detectors 24. For example, when a temperature Ts detected by a temperature detector 24 is lower than a predetermined value Tm that has been set in advance, the controller 28 determines that the temperature of the battery modules 15 needs to be adjusted. In such a case, the controller 28 controls the power supply 26 so that power is supplied from the power supply 26 to the sheet heater 23. As a result, the sheet heater 23 generates heat. The heat generated by the sheet heater 23 is transmitted to the lid 18 of the accommodation container 14 that is thermally coupled to the sheet heater 23. Further, some of the heat is transmitted to the air in the accommodation container 14.

The heat transmitted to the lid 18 is further transmitted by the side walls 17B and 17C to the battery modules 15. This warms the battery modules 15. The sheet heater 23 continues to heat the battery modules 15 until Ts≥Tm is satisfied.

The accommodation container 14 is formed from a metal material having good thermal conductance. Thus, the accommodation container 14 functions as a heat storage body. Some of the heat transmitted to the accommodation container 14 is temporarily stored in the accommodation container 14. The amount of heat stored in the accommodation container 14 is proportional to the heat capacity of the accommodation container 14. The heat capacity of the accommodation container 14 is proportional to the mass of the accommodation container 14 (heat capacity=specific heat×mass). Thus, when the volume of the accommodation container 14 increases, the amount of heat stored in the accommodation container 14 increases.

When the temperature Ts detected by a temperature detector 24 is higher than the predetermined value Tm, which has been set in advance, the temperature adjustment (warming) of the battery module 15 is determined as being unnecessary. In such a case, the temperature of the battery modules 15 is not adjusted.

The battery forklift according to one embodiment of the present invention has the advantages described below.

(1) The sheet heater 23 is thermally coupled to the accommodation container 14. The battery modules 15 are also thermally coupled to the accommodation container 14. Thus, the sheet heater 23 indirectly heats the battery modules 15 through the accommodation container 14. This allows the temperature of every one of the battery modules 15, which are thermally coupled to the accommodation container 14, to be uniformly adjusted.

(2) The lid 18 of the accommodation container 14 is increased in thickness to increase the amount of heat stored (heat capacity). Thus, the lid 18 absorbs more heat, which is generated by the sheet heater 23. This allows the heat generated by the sheet heater 23 to be efficiently transmitted to the accommodation container 14.

(3) The accommodation container 14 has a higher thermal conductivity than air. Thus, most of the heat generated by the sheet heater 23 is transmitted to the battery modules 15 through the accommodation container 14. This allows the temperature of the battery modules 15 to be adjusted more efficiently than when the temperature of the battery modules 15 is adjusted by air (by thermal conduction of air).

(4) A sheet heater having a large size would be necessary to heat the battery modules 15 through the gap K (air). The present embodiment needs only one sheet heater 23, which is thermally coupled to the accommodation container 14. This simplifies the structure of the battery pack 25 and reduces costs.

(5) The insulator 19 is arranged on the periphery of the accommodation container 14. The insulator 19 limits the leakage of heat from the accommodation container 14. Thus, the insulator 19 is used to adjust the temperature of the battery modules 15 without releasing the heat generated by the sheet heater 23 to the outside. This further improves the thermal efficiency and shortens the time for adjusting the temperature of the battery modules 15.

(6) The battery pack 25 also functions as a counterweight. This allows the balance of the vehicle body to be adjusted even when using a light lithium-ion battery as the battery module 15.

(7) The side walls 17B and 17C are thicker than the side walls 17D and 17E. Thus, the heat transmitted from the sheet heater 23 to the lid 18 is efficiently transmitted to the side walls 17B and 17C, to which the battery modules 15 are connected.

The invention is not limited to the foregoing embodiments and various changes and modifications of its components may be made without departing from the scope of the present invention. For example, the present invention may be modified as follows.

In the embodiment of the present invention, the accommodation container 14 is formed from a metal material having a higher thermal conductivity than air. However, the accommodation container 14 may be formed from, for example, a resin material instead of metal if the material has a higher thermal conductivity than air.

In the embodiment of the present invention, the sheet heater 23 is used as a temperature adjuster. Instead, a Peltier device may be used as a temperature adjuster. A Peltier device is used as a heating source (heater) or a cooling source (heat absorber) in accordance with the direction of current flowing into the Peltier device. When used as a heating source, the Peltier device heats the accommodation container 14 to heat the battery modules 15. Thus, the same advantage is obtained as the embodiment of the present invention that uses the sheet heater 23. When used as a cooling source, the Peltier device cools the accommodation container 14 to cool the battery modules 15. In such a case, the accommodation container 14 functions as a cool storage body. This limits increases in the temperature of the battery modules 15 and uniformly cools the entire battery pack. Further, a cooling machine may be used as a temperature adjuster instead of the sheet heater 23 to cool the battery modules 15.

In the embodiment of the present invention, the accommodation container 14 also functions as a counterweight. However, the accommodation container 14 does not have to function as a counterweight.

In the embodiment of the present invention, the heat transmission plate 22 is thermally coupled to each cell 20. However, the heat transmission plate 22 may be omitted if each cell 20 and the accommodation container 14 are thermally coupled.

In the embodiment of the present invention, the battery is a prismatic battery. Instead, the battery may have another structure (for example, laminated battery or cylindrical battery).

In the embodiment of the present invention, each battery module 15 includes the temperature detector 24. However, the battery module 15 does not have to include the temperature detector 24. For example, a temperature detector may be arranged in the accommodation container 14 or around the accommodation container 14. When the battery module 15 does not include the temperature detector 24, the temperature of the battery module 15 is estimated from a detected temperature.

In the embodiment of the present invention, each battery module 15 includes a single temperature detector 24. However, each battery module 15 may include a plurality of temperature detectors 24.

In the embodiment of the present invention, the controller that controls the load 27 and the controller 28 that controls the power supply 26 of the sheet heater 23 may be integrated into a single controller.

What is claimed is:

1. A battery pack comprising:
   a battery module including a plurality of cells;
   a housing that accommodates the battery module, wherein the housing is thermally coupled to the battery module; and
   a temperature adjuster that is thermally coupled and attached to an inner wall surface of the housing such that the temperature adjuster is configured to adjust a temperature of the housing and a temperature of the battery module through conductive heat transfer,
   wherein the temperature adjuster includes a heater, and
   an insulator that covers the housing.

2. The battery pack according to claim 1, wherein the housing has a higher heat conductivity than air.

3. The battery pack according to claim 1, wherein the housing is a counterweight arranged in a battery forklift.

4. The battery pack according to claim 1, wherein the temperature adjuster adjusts the temperature of the battery module via conductive heat transfer through the housing.

5. The battery pack according to claim 1, wherein a gap is provided between the battery module and the temperature adjuster.

6. The battery pack according to claim 1, wherein a heat transmission plate is arranged between the cells.

7. The battery pack according to claim 1, wherein a heat transmission plate is arranged between the cells and the housing.

* * * * *